April 18, 1939.  C. H. NICKELL  2,154,636
BRAKING SYSTEM
Filed Aug. 25, 1937  2 Sheets-Sheet 1
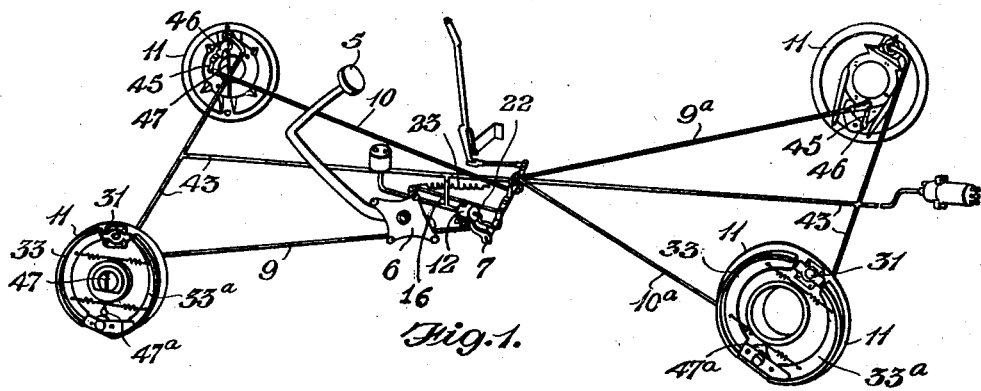
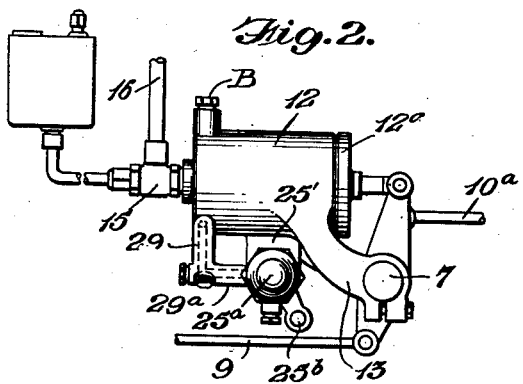
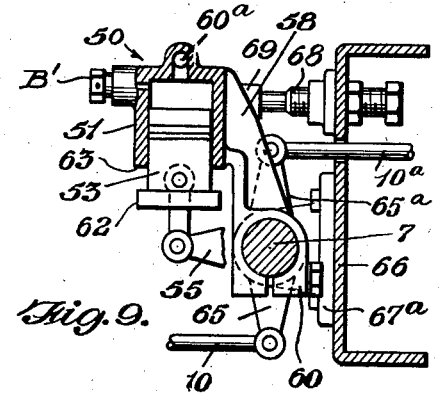
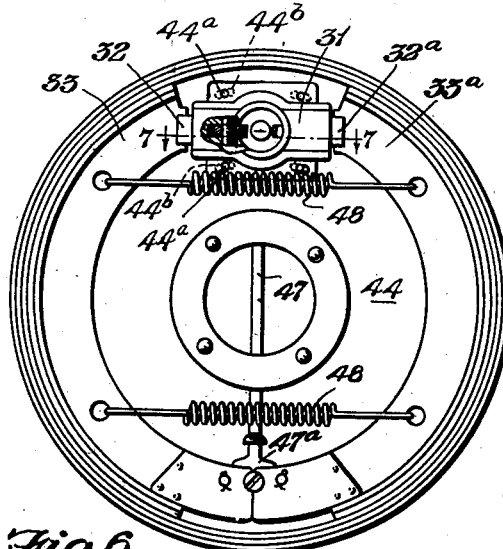
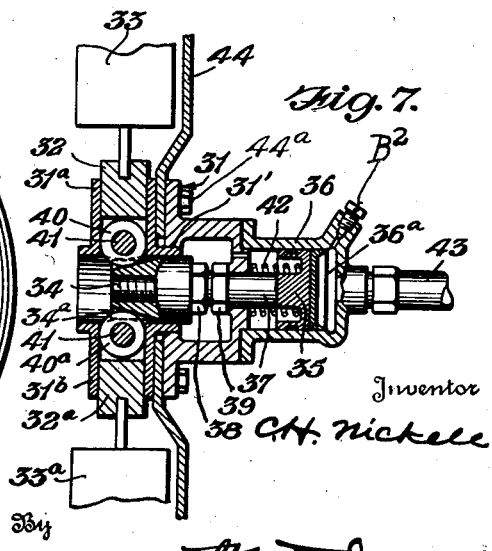

April 18, 1939. C. H. NICKELL 2,154,636
BRAKING SYSTEM
Filed Aug. 25, 1937 2 Sheets-Sheet 2
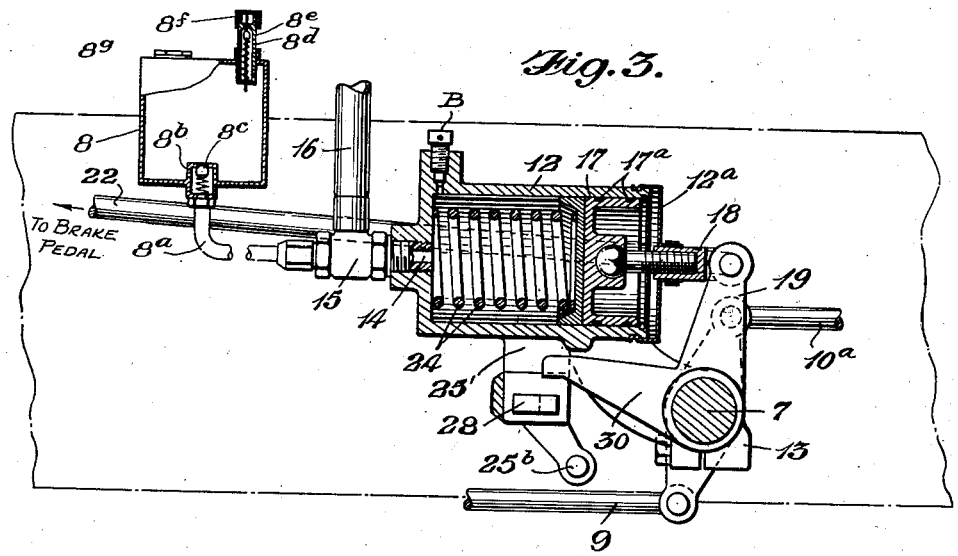
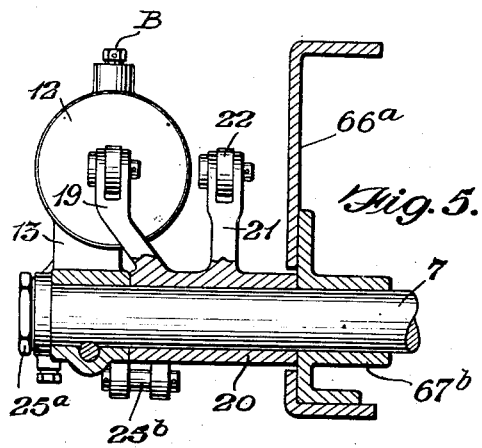
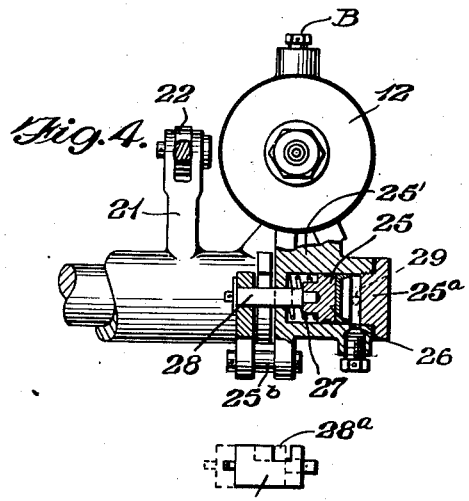
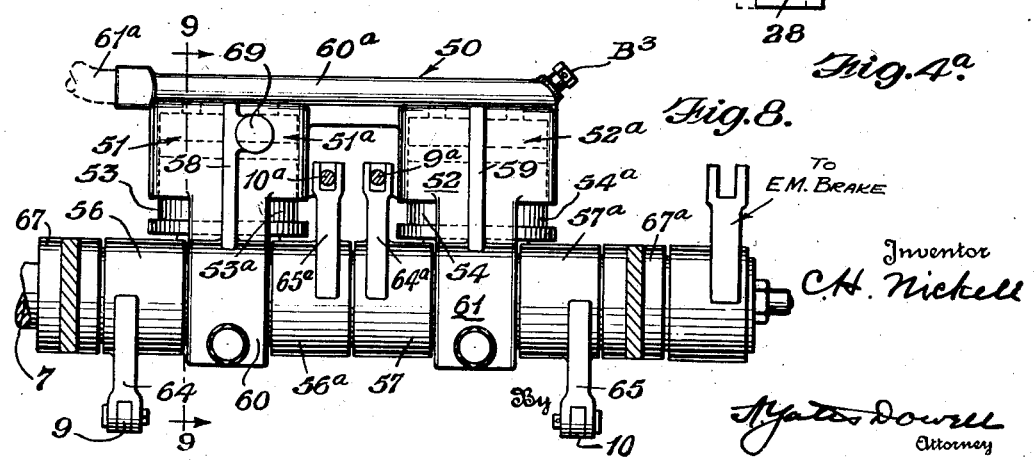
Inventor
C. H. Nickell
By A. Yates Dowell
Attorney Patented Apr. 18, 1939

2,154,636

UNITED STATES PATENT OFFICE 2,154,636

BRAKING SYSTEM

Claude H. Nickell, Newcastle, Ind.

Application August 25, 1937, Serial No. 160,901

15 Claims. (Cl. 188—106)

This invention relates to brake mechanism.

An object of the invention is to provide a combined hydraulic and mechanical braking system for motor vehicles which ensures equalized braking action both hydraulically and mechanically, is positive in operation, relatively simple in construction, and may if desired be installed with comparative ease as an attachment in conjunction with mechanical braking systems now used on certain types of automobiles, trucks, and other motor vehicles with relatively few changes in such systems.

Another object of the invention is to provide a combined hydraulic and mechanical braking system so constructed that should either the hydraulic or mechanical system fail, the other system will automatically be brought into action.

Another object of the invention is to provide an hydraulic braking system which may be manufactured and installed at a comparatively low cost as an accessory in conjunction with a mechanical braking system, and which is so constructed as to render the entire system proof against failure and at the same time equalize and improve the braking action.

Another object is to improve braking systems generally by rendering them more safe and efficient in operation.

Another object is to provide in conjunction with an hydraulic braking system a fluid or hydraulic coupling member adapted for easy attachment to the system and which provides a convenient and safe means for connecting up a trailer or like vehicle.

The present improved braking mechanism, while not restricted thereto, has been devised particularly for use as an attachment in conjunction with a mechanical brake, such as those used on Ford cars, and is shown in the drawings installed in connection with a Ford system. It will be understood, however, that the present improved system may be installed as an original system or as a complete replacement unit, the invention not being restricted in this respect.

In the drawings:

Fig. 1 is a perspective view of a combined hydraulic-mechanical brake assembly embodying the features of the present invention;

Fig. 2 is a view in side elevation of the master cylinder assembly and connections;

Fig. 3 is a sectional view of Fig. 2;

Fig. 4 is a view in front end elevation of Fig. 2 with parts in section;

Fig. 4a is a detail view of a lock member;

Fig. 5 is a view in section and rear end elevation of Fig. 2;

Fig. 6 is an inner side elevation of one of the brake drums showing the hydraulic brake shoe spreader and equalizer unit partly in section;

Fig. 7 is a section taken substantially on the line 7—7, Fig. 6;

Fig. 8 is a view in rear elevation of a modified type of hydraulic brake-actuating and equalizing attachment;

Fig. 9 is a section taken substantially on the line 9—9, Fig. 8.

Referring to the drawings in detail and particularly Fig. 1, a brake pedal is indicated at 5 and is pivotally supported from a bracket 6 which may be bolted or otherwise secured to the frame of the vehicle. In operative adjacency to the brake pedal is a brake cross shaft 7 which has connected thereto cross shaft levers which in turn connect with pull rods 9, 9a, 10 and 10a, the latter extending back to the respective brake drums 11 and being operatively connected to the brake shoes of the latter.

In the form of the invention shown in Figs. 2 to 7 inclusive, the braking system is of the combined hydraulic-mechanical type and is constructed to simultaneously apply both an hydraulic and mechanical braking action to the brake drums with positive equalization, and should the hydraulic system fail, the mechanical system will operate irrespective of such failure. The means for attaining this object include a supply and bleeder tank 8, a master cylinder assembly (note particularly Fig. 3) comprising a cylinder 12 having a detachable flexible end cover 12a, the cylinder being mounted on a bracket 13 which is connected to the brake cross shaft 7 to rotate with the latter. At its one end, the cylinder 12 is provided with an exhaust port 14 having connected thereto a coupling union 15, to which is connected a flexible hydraulic line 16 leading to the main fluid lines which in turn will lead to the brake spreader and equalizer units hereinafter described.

Also connected to the union 15 is a flexible line 8a which connects to the supply and bleeder tank 8, the latter being provided with a boss 8b which is ported and houses a spring-pressed check valve 8c, this valve permitting fluid to be drawn from the tank 8 should the supply lower in the cylinder 12 while at the same time preventing a return flow of fluid from said cylinder. The top of the tank is preferably provided with a combined venting and bleeder valve 8d having a spring-pressed valve member 8e and a vented cap 8f. When the cap is in place and screwed down, it depresses valve member 8e and vents tank 8, but when it is desired to bleed the system, cap 8f is removed, permitting valve member 8e to close the valve port, so that an air pump may be operatively connected to the valve 8d and air forced into the tank 8 to exert pressure on the fluid in the system. Thus valve 8d functions as a venting valve when cap 8f is applied and as a one-way bleeder valve when said cap is removed. Tank 8 is also provided with a filler cap 8g. It will be noted that the boss 8b provides a well at the bottom of the tank for collecting sediment.

A piston 17 is mounted in the cylinder 12 and is provided with lubricating rings 17a which may be and preferably are formed of fabric or like porous material capable of absorbing a lubricant, said rings serving to lubricate the wall of the cylinder during travel back and forth in the latter. The piston 17 has connected thereto a link 18 which at its inner end has a ball and socket connection with said piston, and at its outer end is pivotally connected to a lever 19 which is formed integrally with or connected to a sleeve 20 mounted for free rotation on the brake cross shaft 7. Sleeve 20 is also provided with a lever 21 which is connected with the brake pedal 5 through the medium of a link or connecting rod 22, note Fig. 1. When the brake pedal is depressed, lever 19 is rotated to the left as viewed in Fig. 3 to thereby drive the piston 17 inwardly and force the fluid in the cylinder 12 outwardly into the fluid line 16 in a manner well understood in the art. A spring 23 serves to retract the brake pedal member, and likewise a spring 24 is mounted in the cylinder 12 and serves to insure retraction of the piston 17.

By referring to Figs. 2 and 4, it will be noted that a relatively small auxiliary cylinder 25 is formed in a bracket member 25' depending from the master cylinder 12 and is provided with an end cover in the form of a screw cap 25a. This cylinder forms part of what may be termed a mechanical brake lock-in assembly and has mounted therein a piston 26 which moves inwardly against the tension of a retracting spring 27, said piston having connected thereto a lock 28, note the detail view in Fig. 4a, with a notch or recess 28a. Fluid pressure is transmitted from the master cylinder 12 to the cylinder 25 through a port or conduit 29 formed in casting 29a. Bracket 25' projects downwardly and at its lower end is provided with a stop in the form of a pin 25b. Connected to and rotatable with the sleeve 20 is an arm 30, the end of which is adapted to normally register with the notch or recess 28a formed in the lock 28.

It will be seen that when the piston 17 in the master cylinder 12 is depressed, fluid will pass through port 29 into the cylinder 25 and force the piston 26 inwardly. When this happens, the lock 28a moves out into the path of the arm 30, and under normal operating conditions the end of said arm will register with said notch and allow the arm to pass therethrough. The lock, however, is normally in the path of said arm, and should for any reason the fluid pressure fail and the lock fail to move outwardly and cause registration of the notch with said arm, the latter will contact the lock.

Figs. 6 and 7 show the preferred type of brake shoe spreader and equalizing unit for the hydraulic system. The brake-shoe and drum assembly shown in Figs. 6 and 7 is of the type used on 1935 and 1936 Ford cars, the mechanical side of the system being the conventional Ford structure. Referring in detail to these figures, a two-part casting or housing is generally indicated at 31, 31', the latter being provided with oppositely disposed cylinders 31a and 31b in which brake shoe spreader plungers 32 and 32a are mounted. Connected to these plungers are brake shoes 33 and 33a. The shoes are spread by means of a spreader—cam 14 having wedge-shaped cam slots or grooves 34a therein the plunger being driven inwardly by means of fluid pressure acting on a piston 35, which is mounted in cylinder 36, the latter being provided with a chamber 36a. The piston is provided with a stem or connector 37 which is adjustably threaded into the spreader cam 34 and is locked in position by means of nut 38. An adjusting nut 39 is also provided for facilitating adjustment of the spreader cam 37.

Spreader rollers 40 and 40a are rotatably mounted on bearing pins 41 journaled in the plungers 32 and 32a and these rollers are adapted to ride in the cam grooves 34a of the spreader cam 34 when the latter is driven inwardly to thereby spread the brake shoes 33 and 33a. Means for retracting the spreader cam such as spring 42 is provided. Fluid may be supplied to the cylinders 36a through flexible hose connections or conduits 43, note also Fig. 1.

This assembly may be connected to the conventional Ford brake shoe assembly without any change other than to remove the conventional adjustable anchors for said shoes. As will be noted, the castings 31 and 31' are secured on opposite sides of the brake shield or plate 44 by means of cap screws 44a which project through arcuate slots 44b formed in the plate 44, to thereby provide for automatic centering of the brake shoes when applied and equalize wear on the lining of the coacting shoes.

The brake rods 9, 9a, 10 and 10a each connect at its outer end with a lever 45, note also Fig. 1, mounted on a stub shaft 46, the inner end of which is operatively connected to the conventional spreader cam 47a, said cam on the front brake assembly being operated through the medium of pin 47. Fig. 6 shows the front brake drum assembly. The shoes may be retracted by means of springs 48.

The improved combined hydraulic and mechanical braking mechanism operates as follows:

When the brake pedal 5 is depressed, the master cylinder plunger 17 is driven inwardly to thereby compress the fluid in the cylinder 21, the pressure being applied through the lines 16 and 43 to the respective spreader pistons 35 thereby driving the latter inwardly and causing the spreader cams 34 to exert an equalized spreading pressure on the rollers 40 and 40a and spread the brake shoes 33 and 33a. When the piston 17 of the master cylinder 12 is first moved inwardly, the pressure on the fluid therein is transmitted through conduit or port 29 to the lock cylinder 25, thereby driving the piston 26 inwardly and moving the lock 28 to a position where the notch 28a will register with the end of the arm 30 and permit the latter to pass through said notch. The cylinder 12 also rotates as hydraulic pressure is applied, turning brake cross shaft 7 and the respective brake rod levers secured thereon to thereby apply mechanical braking pressure simultaneously with the hydraulic braking pressure.

This action is effected by reason of the fact that when the brake pedal 5 is depressed, the piston 17 is caused to move generally to the left, referring to Figure 3, tending to cause motion of the fluid within the cylinder 12, which motion in turn will be transmitted to the cylinder 12 bodily and tend to cause its rotation about the shaft 7. No hydraulic pressure will be applied to the brake shoes through the tube 16 until the motion of the piston 17 is transmitted through the medium of the fluid within the cylinder 12, through the medium of the cylinder wall itself, through the member 13, to tend to cause rotation of the shaft 7. When this point is reached resistance of the mechanical side of the braking system is met. Simultaneously therewith the hydraulic side of the braking system will be placed in operation.

This explanation may be more readily understood by assuming a situation not occurring in applicant's system; that is, assume that the cylinder 12 were held stationary by some means, then motion of the piston 17 would transmit the fluid through the tube 16 to the hydraulic side of the system effecting braking operation. However, this is not applicant's arrangement for here the cylinder 12 may move. This motion will prevent premature transmission of fluid through the tube 16 to the hydraulic side of the braking system. Operation of the hydraulic side of the braking system may only be effected when resistance to the turning of cylinder 12 occurs because of resistance inherent in the turning of shaft 7. The turning of shaft 7 effects the operation of the mechanical side of the system. Hence simultaneously with the meeting of resistance or initiation of the operation of the mechanical side of the system, fluid will be transmitted through the tube 16 causing spreading of retraction springs 48 which interpose substantially the same resistance in the hydraulic as in the mechanical system. During the initiation of this spreading of the springs 48, a balancing action takes place between the hydraulc and mechanical side of the braking system through the fluid medium within the master cylinder. To put it another way, the medium within the master cylinder, and the master cylinder and its associated parts, serve to meter pressure accurately between the mechanical and hydraulic sides. Thus an equalized combined hydraulic and mechanical braking action is applied to the shoes of the brake drums at diametrically opposed points.

Should the fluid pressure fail for any reason in the hydraulic system, then the lock-out cylinder assembly will fail to act and the lock 28 will remain stationary so that the end of the arm 30 will contact the said lock within a short throw of the brake pedal and the entire master cylinder assembly will rotate and turn the brake cross shaft 7 and apply the mechanical system regardless of whether or not the hydraulic system is operating.

Figs. 8 and 9 show a unit which may be used in conjunction with the master cylinder assembly of Figs. 2 to 5, inclusive, and serve as a combined brake equalizer and hydraulic applier of a mechanical system, or may be used in conjunction with said assembly and that shown in Figs. 1, 6 and 7 and serve as a combined hydraulic-mechanical system with positive equalization. This unit comprises a main casting or housing generally indicated at 50 which has formed therein cylinders 51, 51a and 52, 52a which may be and preferably are of duplicate construction, the sectional view in Fig. 9 illustrating in section the cylinder 51. Within these cylinders pistons 53, 53a and 54, 54a are mounted and at their lower ends are pivotally connected to bell crank levers 55 which are formed integrally with sleeves 56, 56a and 57, 57a mounted on brake cross shaft 7. The casting 50 is formed with rear bracket portions 58 and 59 which at their lower ends terminate in sleeves 60 and 61 secured on the brake cross shaft 7. The upper extremity of the casting 50 is formed with a port or conduit 60a which is common to the cylinders 51, 51a and 52, 52a, a flexible hydraulic line 61a connecting with said port and leading to the master cylinder of Figs. 2 to 5 inclusive, or to a suitable junction in the main hydraulic line 43 of Fig. 1.

The brake pull rods 9, 9a and 10, 10a are connected to levers 64, 64a 65 and 65a which in turn are connected to the sleeves 56, 57 and 57a, 56a respectively. Each of the pistons 53, 53a and 54, 54a is provided with a lower stop flange 62 which when the brakes are in retracted position contacts the adjacent flange 63 of its cylinder, note particularly Fig. 9, this figure illustrating the piston under substantially full fluid pressure or load.

The brake cross shaft 7 is journaled in suitable bearing brackets 67, 67a connected to frame cross member 66, note Figs. 8 and 9, and outer bearing bracket 67b connected to side rail 66a, note Fig. 5.

Adjusting means in the form of a threaded stop bolt 68 is mounted in the frame cross member 66 and is adapted to contact at its inner end an abutment or stop 69 formed on the portion 51 of the casting 50 to maintain a predetermined setting of the casting and prevent reverse rotation of the latter until the pressure between the hydraulic and mechanical sides of the system become equalized.

Assuming the unit shown in Figs. 8 and 9 is to be used in conjunction with the master cylinder 12 as a combined brake equalizer and hydraulic applier, then when the brake pedal is depressed and fluid pressure is built up in the master cylinder 12, such pressure is transmitted to the respective cylinders 51, 51a, 52 and 52a through flexible conduits 16 and 61a and the conduit 60a. As pressure is built up in these latter cylinders, the pistons 53, 53a, 54 and 54a are moved downwardly until complete equalization takes place between the respective brake pull rods, or until a balancing action takes place between the hydraulic and mechanical sides of the system. Up until this time, the housing of casting 50 is backed up by the adjustable stop 68. Fig. 9 shows the relative position of piston 53 under balanced load, or when a balanced or equalized condition is reached. From this point on, the master cylinder 12 and the housing or casting 50 rotate with the cross shaft 7 and the brakes are applied while at the same time an equalized hydraulic pressure is exerted throughout the complete brake-applying operation.

In the event fluid pressure in the master cylinder 12, or any part of the hydraulic system should fail, then the end of the arm 30 will fail to register with the notch 28a of lock 28 and will contact the latter and rotate the master cylinder 12; and since the abutment flange 62 will then be in contact with the base 63 of the respective cylinders, the housing or casting 50 and assembly coacting therewith will also rotate as a unit with the shaft 7. Thus it will be seen that in the event of failure of the hydraulic or fluid system the system operates purely as a mechanical system.

Assuming that it is desired to use the unit shown in Figs. 8 and 9 in conjunction with both the master cylinder 12 and the hydraulic brake shoe spreading assembly shown in Figs. 6 and 7, or as a combined hydraulic and mechanical braking system as in Fig. 1, then the system will function substantially as heretofore described in connection with Figs. 1 to 7 inclusive, with the additional advantage that positive equalization will be insured at all times on both the mechanical and hydraulic sides of the system.

Since the brake cross shaft 7 is common to both the master cylinder 12 and unit shown in Figs. 8 and 9, and since also the respective brake rods are common to these units in both forms of the invention, like reference numerals have been applied to these parts.

From the foregoing it will be seen that a combined mechanical and hydraulic braking system is provided whereby equalization is assured both on the hydraulic and mechanical sides of the system, and whereby should the hydraulic system fail the mechanical system will operate, and vice versa, and without any substantial increase in the throw of the brake pedal, the system being relatively simple and easily applied either as an accessory or as an original installation.

To facilitate bleeding of the system, bleeder valves B, B2 and B3 are placed at all necessary points.

Having thus described the invention with particularity with reference to the preferred method of carrying out the same, it will be obvious to those skilled in the art, after gaining an understanding of the invention, that various changes and modifications may be made therein without departing from the spirit and scope thereof, and the appended claims have been phrased with a view toward covering such changes and modifications as are within the scope of the invention.

I claim:

1. In a braking system, one or more brake shoes or like brake members for each wheel, means for imparting a braking movement to said shoes including a brake pedal, mechanical connections from said pedal to said shoes including a cylinder, fluid connections operatively connecting said cylinder with said shoes, said fluid connections and said mechanical brake connections being so associated with each other and with the brake pedal as to be operable simultaneously to effect action of said brake shoes.

2. In a braking system, in combination with a brake drum, brake shoes operatively associated with said drum, a brake pedal or analogous brake applying member, mechanical connections operatively connecting said pedal with said shoes for operating the latter, an hydraulic cylinder having a piston therein, fluid lines also operatively connecting said cylinder with said shoes, means connecting said pedal with said piston whereby when the pedal is depressed both fluid and mechanical operating braking pressures will be applied to said shoes.

3. In a braking system, in combination with a brake drum having brake shoes operatively associated therewith, a brake pedal, mechanical connections operatively connecting said pedal with said shoes, an hydraulic cylinder having a piston therein, fluid connections operatively connecting said cylinder with said shoes for applying an hydraulic operating movement thereto, means including said cylinder connecting said pedal with said piston and also with said mechanical connections whereby when the pedal is depressed both mechanical and hydraulic operating pressure will be simultaneously applied to said shoes, and means for automatically locking said mechanical connections into the system for operation independently of the hydraulic system.

4. In a braking system, in combination with a brake drum having brake shoes operatively connected thereto, a brake pedal or like brake applying means, mechanical means operatively connecting said pedal with said shoes, an hydraulic cylinder having a piston therein, fluid connections operatively connecting said cylinder with said shoes, means operatively connecting said piston with said brake pedal whereby when the pedal is depressed pressure will be built up in said cylinder and fluid connections and simultaneously a mechanical and hydraulic braking action will be applied to said shoes and means for automatically locking the piston to said mechanical connecting means should the fluid pressure fail.

5. In a braking system, in combination with a brake drum having movable brake shoes operatively connected thereto, means for imparting a braking movement to said shoes, a brake cross shaft, mechanical connections operatively connecting said shaft with said brake shoe moving means, an hydraulic cylinder mounted on said shaft to rotate with the latter, fluid connections also operatively connecting said cylinder with said brake shoe moving means, a piston in said cylinder, a brake pedal or like actuating member operatively connected to said piston and also to said shaft whereby when the pedal is depressed the piston is moved in said cylinder and fluid pressure built up therein and also in the fluid connections, and the shaft is rotated and an hydraulic and mechanical braking action is applied to said shoes.

6. In a braking system, a brake drum having brake shoes operatively connected thereto, mechanically-operable shoe-actuating means operatively connected to one extremity of said shoes and hydraulically operable shoe-actuating means operatively connected to the opposite extremities of said shoes for applying a braking movement to the latter, a brake cross shaft, mechanical connections operatively connecting said shaft with the mechanical shoe-actuating means, an hydraulic cylinder mounted on said shaft to rotate with the latter, fluid lines communicating said cylinder with said hydraulic shoe-actuating means, a piston in said cylinder, a brake pedal, means operatively connecting said pedal to said piston and also with said shaft whereby when the pedal is depressed the piston is actuated and the shaft rotated to apply a simultaneous mechanical and hydraulic braking action to said shoes, and means for locking the piston for positive rotation with said shaft should the fluid pressure fail in the hydraulic system.

7. In a braking system, a brake drum having brake shoes operatively connected thereto, mechanically-operable shoe-actuating means operatively connected to the one extremity of said shoes and hydraulically-operable shoe-actuating means operatively connected to the opposite extremities of said shoes for imparting a braking movement to the latter, a brake cross shaft, mechanical connections operatively connecting said shaft with said mechanical shoe-actuating means whereby when the shaft is rotated a mechanical braking action will be applied to said shoes, an hydraulic cylinder mounted on said shaft to rotate with the latter, fluid lines communicating said cylinder with said hydraulic shoe-actuating means, a piston in said cylinder, a brake pedal, means operatively connecting said pedal to said piston and also with said shaft whereby when the pedal is depressed the piston is actuated and the shaft rotated to apply a simultaneous mechanical and braking action to said shoes, and a supplemental hydraulic cylinder in fluid communication with said first named cylinder and having a lock member operatively associated therewith whereby when pressure is set up in said first-named cylinder said lock will be actuated to cause the hydraulic and mechanical braking systems to operate in unison.

8. In a braking system, a brake drum having brake shoes operatively connected thereto, mechanically operable shoe-actuating means operatively connected to one extremity of said shoes and hydraulically-operable shoe-actuating means operatively connected to the opposite extremities of said shoes for imparting a braking movement to the latter, a brake cross shaft, mechanical connections operatively connecting said shaft with said mechanical shoe-actuating means, an hydraulic cylinder mounted on said shaft to rotate with the latter, fluid lines communicating said cylinder with said hydraulic shoe-actuating means, a piston in said cylinder, a brake pedal, means operatively connecting said pedal to said piston and also with said shaft whereby when the pedal is depressed the piston is actuated and the shaft rotated to apply a simultaneous and mechanical braking action to said shoes, an auxiliary mechanical brake lock cylinder in fluid communication with said first-named cylinder, and a piston in said latter cylinder having a lock member operatively connected thereto, said lock member being constructed to connect the mechanical braking connections for positive movement with said first named piston should the hydraulic system fail.

9. In a braking system, a brake drum having brake shoes operatively connected thereto, shoe-actuating means operatively connected to opposite extremities of said shoes, a brake cross shaft, mechanical and hydraulic connections operatively connecting said cross shaft with shoe-actuating means, an hydraulic cylinder mounted on said shaft to rotate with the latter and having a piston therein, a brake pedal or like actuating member, means connecting the pedal with said piston whereby when the pedal is depressed fluid pressure is built up in said cylinder and fluid connections and the shaft is turned to simultaneously apply the brakes both mechanically and hydraulically, an auxiliary lock cylinder in fluid communication with said first-named cylinder, and a piston in said latter cylinder having a lock connected thereto, said lock being constructed to normally permit the first named piston to have relative movement with respect to said shaft but upon failure of fluid pressure in the hydraulic system locking the said latter piston for positive movement with the shaft.

10. In a braking system, brake drums having brake shoes operatively connected thereto, a brake pedal or like brake-applying member, means connecting said pedal with said shoes including a plurality of fluid pressure brake equalizing cylinders having pistons therein, a fluid pressure device common to said cylinders and controlled by said pedal, and means for locking the said equalizing cylinders out of the system should the fluid pressure fail.

11. In a braking system, a brake drum having brake shoes operatively connected thereto, a rotatable cross shaft, a brake pedal or like brake-applying means, a plurality of fluid pressure brake equalizing cylinders connected to said shaft for rotation therewith, pistons in said cylinders having mechanical operating connections with said shoes, a main fluid pressure cylinder common to said equalizing cylinders and having a piston operable by said pedal and connected for normal relative rotative movement with respect to said shaft, and means for locking said latter piston for positive movement with said shaft should the fluid pressure fail in any of the cylinders or fluid connections.

12. In a braking system, brake drums having brake shoes operatively connected thereto, a rotatable brake cross shaft, a brake pedal or like brake-applying means, a plurality of fluid pressure brake equalizing cylinders connected to said shaft for rotation with the latter, pistons in said cylinders each having a mechanical operating connection with said shoes, a main pressure cylinder common to said equalizing cylinders and also connected to said shaft for rotation therewith and having a piston therein connected to said brake pedal, said latter piston being mounted on the brake cross shaft and normally having relative rotative movement with respect to said shaft, and means locking said main pressure cylinder piston to the brake cross shaft for positive movement with the latter should the fluid pressure in any of the cylinders or fluid connections fail.

13. In a braking system, brake drums having brake shoes operatively connected thereto, a rotatable brake cross shaft, a brake pedal or like brake applying means, a plurality of fluid pressure brake equalizing cylinders connected to said shaft for rotation with the latter, pistons in said cylinders each having a mechanical operating connection with the shoes of a drum, a main pressure cylinder also connected to the shaft for rotation therewith and having a piston therein operatively connected to said pedal, said latter piston being connected to said shaft for normal relative rotation with respect thereto, means locking said main pressure cylinder piston to the shaft should the fluid pressure fail in the fluid system, and means, also locking said equalizing cylinder pistons to said shaft in the event of such failure.

14. In a braking system, brake drums having brake shoes operatively connected thereto, a rotatable brake cross shaft, a brake pedal or like brake applying means, a plurality of fluid pressure brake equalizing cylinders connected to said shaft for rotation in unison therewith, pistons in said cylinders each having a mechanical operating connection with the shoes of a drum, means operable by the brake pedal for setting up fluid pressure in said cylinder to actuate said pistons and through the latter the shoes, and an adjustable stop for taking the rearward thrust of said cylinders.

15. In a braking system, mechanical brake applying means for a wheel of a vehicle, hydraulic brake applying means operatively associated with said mechanical means, and means for operating said hydraulic and mechanical means simultaneously and continuously throughout the braking cycle, said last mentioned means being energized by a common operating element, whereby upon operation of said operating element the hydraulic and mechanical brake applying means will simultaneously and continuously effect braking.

CLAUDE H. NICKELL.